United States Patent
Song et al.

(10) Patent No.: US 9,804,897 B2
(45) Date of Patent: Oct. 31, 2017

(54) METHOD AND APPARATUS FOR MANAGING POWER IN VIRTUALIZATION SYSTEM USING DIFFERENT OPERATING SYSTEMS

(71) Applicant: Samsung Electronics Co., Ltd., Gyeonggi-do (KR)

(72) Inventors: Jeong Ig Song, Seoul (KR); Kwon Sik Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 482 days.

(21) Appl. No.: 14/383,535

(22) PCT Filed: Mar. 6, 2013

(86) PCT No.: PCT/KR2013/001794
§ 371 (c)(1),
(2) Date: Sep. 5, 2014

(87) PCT Pub. No.: WO2013/133621
PCT Pub. Date: Sep. 12, 2013

(65) Prior Publication Data
US 2015/0058845 A1    Feb. 26, 2015

(30) Foreign Application Priority Data
Mar. 6, 2012    (KR) .................. 10-2012-0022614

(51) Int. Cl.
*G06F 1/32*        (2006.01)
*G06F 9/50*        (2006.01)
(Continued)

(52) U.S. Cl.
CPC .......... *G06F 9/5094* (2013.01); *G06F 1/3203* (2013.01); *G06F 9/45533* (2013.01);
(Continued)

(58) Field of Classification Search
None
See application file for complete search history.

(56) References Cited

U.S. PATENT DOCUMENTS 8,589,921 B2 *  11/2013  Heim .................. G06F 9/45558
                                                    718/1
2003/0046396 A1 *  3/2003  Richter .................. G06F 9/505
                                                    709/226
(Continued)

FOREIGN PATENT DOCUMENTS

KR    10-2006-0023951    3/2006
KR    10-2006-0083168    7/2006

OTHER PUBLICATIONS

International Search Report dated Jun. 10, 2013 in connection with International Patent Application No. PCT/KR2013/001794, 5 pages.
(Continued)

Primary Examiner — Nitin Patel

(57) ABSTRACT

Provided are a power management method and apparatus that minimize power consumption in a virtualization system using different operating systems. The power management method operates on a virtualization layer, and may include: monitoring usage states of real processors actually performing tasks and usage states of virtual processors mapped with the real processors and executing operating systems or applications; predicting workload of a virtual processor; computing the utilization level of a real processor enough for supporting the predicted workload; and reconfiguring the mapping between real processors and virtual processors according to the computation result. Hence, different power management schemes of multiple operating systems or applications are managed at the virtualization layer in an integrated manner, preventing a conflict caused by applica-
(Continued)

tion of different power management schemes. Power consumption in the overall system can be minimized through prediction of resource usage.

18 Claims, 9 Drawing Sheets

(51) Int. Cl.
G06F 9/455 (2006.01)
G06F 11/34 (2006.01)

(52) U.S. Cl.
CPC ........ *G06F 9/45558* (2013.01); *G06F 9/5077* (2013.01); *G06F 9/5083* (2013.01); *G06F 11/3433* (2013.01); *G06F 2009/4557* (2013.01); *G06F 2009/45591* (2013.01); *G06F 2201/815* (2013.01); *G06F 2209/5019* (2013.01); *Y02B 60/142* (2013.01); *Y02B 60/165* (2013.01); *Y02B 60/167* (2013.01)

(56) References Cited

U.S. PATENT DOCUMENTS

| | | | |
|---|---|---|---|
| 2006/0069761 A1* | 3/2006 | Singh | H04L 67/1008 709/222 |
| 2009/0150896 A1* | 6/2009 | Tsushima | G06F 1/3203 718/104 |
| 2011/0145616 A1 | 6/2011 | Rychlik et al. | |
| 2012/0011254 A1* | 1/2012 | Jamjoom | G06F 9/4856 709/226 |

OTHER PUBLICATIONS

Written Opinion of International Searching Authority dated Jun. 10, 2013 in connection with International Patent Application No. PCT/KR2013/001794, 7 pages.

Jan Stoess, et al., "Energy Management for Hypervisor-Based Virtual Machines", 2007 USENIX Annual Technical Conference, Article No. 1, 2007, 14 pages.

Christoph Kleineweber, et al., "Rule-Based Mapping of Virtual Machines in Clouds", 2011 19th International Euromicro Conference on Parallell, Distributed and Network-Based Processing (PDP), Feb. 11, 2011, pp. 527-534.

* cited by examiner

METHOD AND APPARATUS FOR MANAGING POWER IN VIRTUALIZATION SYSTEM USING DIFFERENT OPERATING SYSTEMS

CROSS-REFERENCE TO RELATED APPLICATION(S)

The present application claims priority under 35 U.S.C. §365 to International Patent Application No. PCT/KR2013/001794 filed Mar. 6, 2013, entitled "METHOD AND APPARATUS FOR MANAGING POWER IN VIRTUALIZATION SYSTEM USING DIFFERENT OPERATING SYSTEMS". International Patent Application No. PCT/KR2013/001794 claims priority under 35 U.S.C. §365 and/or 35 U.S.C. §119(a) to Korean Patent Application No. 10-2012-0022614 filed Mar. 6, 2012, and which are incorporated herein by reference into the present disclosure as if fully set forth herein.

TECHNICAL FIELD

The present invention relates to a power management method and apparatus that minimize power consumption in a virtualization system using different operating systems.

BACKGROUND ART

FIG. 1 illustrates a virtualization system according to the related art.

A virtualization system is a system that creates a virtual machine through emulation of a computing device and enables the virtual machine to execute functions of a hardware device or to control the same. When a virtualization system is used, it may appear to the user that an application or operating system runs on the virtual machine, but the virtual machine identifies itself as an actual hardware device and operates as the actual hardware device.

Recently, utilization of virtualization systems has increased in environments where data centers, cloud computing devices, computer clusters, and enterprise-wide computers are needed.

In the related art, when a virtualization system is used, power management is performed by monitoring the amount of power consumed by hardware devices and controlling capacity of power or distribution thereof at the overall system level. As related-art virtualization systems are mainly applied to servers that do not have limitations on the usage or capacity of power, power management focuses more on efficient utilization of resources rather than reduction of power consumption.

Multiple operating systems or applications may be run in parallel in an embedded system based on a virtualization system. In such a case, as the amount of available power is limited, it is necessary to perform power management in consideration of efficient utilization of resources and reduction of current consumption.

Additionally, different operating systems or applications may perform power management according to different schemes, and hence it is necessary to develop a unified power management scheme.

DISCLOSURE OF INVENTION

Technical Problem

The present invention has been made in view of the above problems. Accordingly, an aspect of the present invention is to provide a power management method and apparatus for a virtualization system wherein different power management schemes of multiple operating systems or applications are managed in an integrated manner at the virtualization layer and power is efficiently managed through prediction of resource usage.

Solution to Problem

In accordance with an aspect of the present invention, a method for power management on a virtualization layer in a virtualization system using different operating systems is provided. The method may include: monitoring usage states of real processors actually performing tasks and usage states of virtual processors mapped with the real processors and executing operating systems or applications; predicting workload of a virtual processor; computing the utilization level of a real processor enough for supporting the predicted workload; and reconfiguring the mapping between real processors and virtual processors according to the computation result.

In accordance with another aspect of the present invention, an apparatus for power management in a virtualization system using different operating systems is provided. The apparatus may include: real processors actually performing tasks; virtual processors mapped with the real processors and executing operating systems or applications; and a control unit to control, on a virtualization layer, a process of monitoring usage states of the real processors and virtual processors, predicting workload of a virtual processor, computing the utilization level of a real processor enough for supporting the predicted workload, and reconfiguring the mapping between the real processors and virtual processors according to the computation result.

In accordance with another aspect of the present invention, a method for power management on a virtualization layer in a virtualization system using different operating systems is provided. The method may include: monitoring usage states of one or more virtual processors mapped with real processors and executing operating systems or applications; examining, when an operation state change command is received from a virtual processor, operation state of the hardware equipment; and changing, when the hardware equipment is concurrently used by multiple virtual processors, the operation state of the hardware equipment in consideration of usage state of the hardware equipment.

In accordance with another aspect of the present invention, an apparatus for power management in a virtualization system using different operating systems is provided. The apparatus may include: one or more virtual processors mapped with real processors actually performing tasks, and executing operating systems or applications; a hardware equipment performing an operation indicated by a command from a virtual processor; and a control unit to control, on a virtualization layer, a process of monitoring usage states of the virtual processors, examining, when an operation state change command is received from a virtual processor, operation state of the hardware equipment, and changing, when the hardware equipment is concurrently used by multiple virtual processors, the operation state of the hardware equipment in consideration of usage state of the hardware equipment.

Advantageous Effects of Invention

In a feature of the present invention, different power management schemes of multiple operating systems or applications are managed at the virtualization layer in an integrated manner. Hence, it is possible to prevent a conflict that may be caused by application of different power management schemes. In addition, it is possible to minimize power consumption in the overall system by predicting usage of resources.

MODE FOR THE INVENTION

In the description, a "real processor" refers to a physical processor or microprocessor that may exist in the real world. In the present invention, a control unit may function as a real processor.

In the description, a "virtual processor" refers to a logical processor that is implemented as a piece of software in a virtualization system and appears as a real processor to a specific device.

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 2:
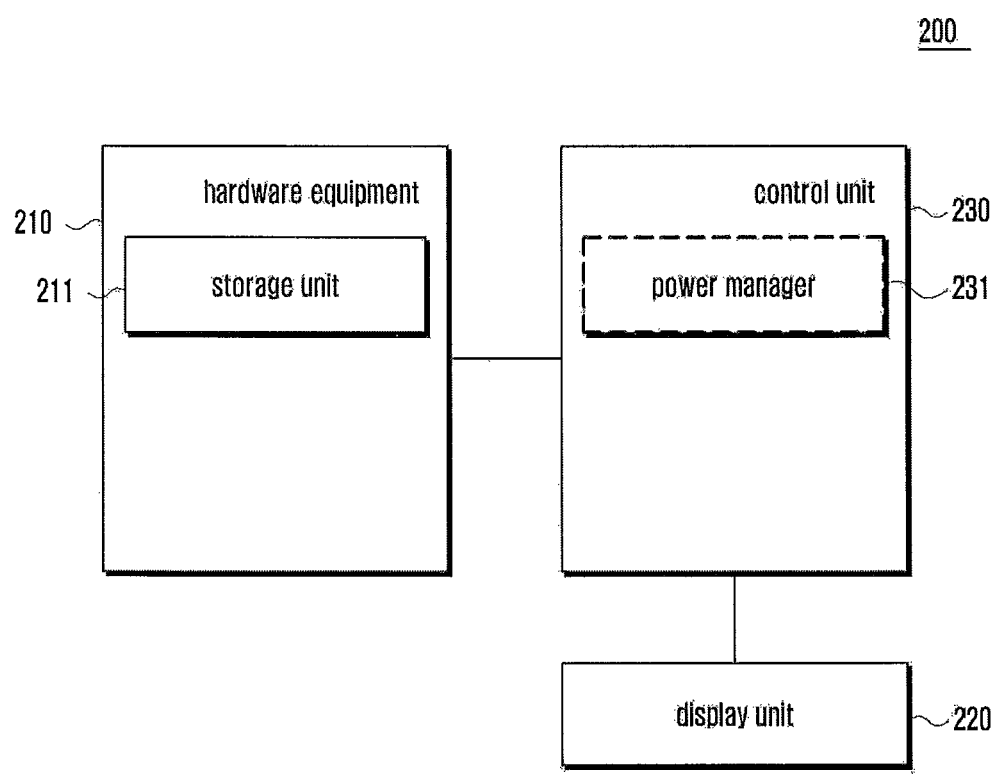
FIG. 2 is a block diagram of a power management apparatus according to an embodiment of the present invention.

FIG. 2 is a block diagram of a power management apparatus according to an embodiment of the present invention.

Referring to FIG. 2, the power management apparatus 200 according to an embodiment of the present invention may include a hardware equipment 210, a display unit 220, and a control unit 230.

The hardware equipment 210 is configured to perform actual processing according to commands from the control unit 230. The hardware equipment 210 may include a storage unit 211, a memory (not shown), a display (not shown), a modem (not shown), a printer (not shown), and other peripherals. In response to an operation switch command from a virtual processor via the control unit 230, the hardware equipment 210 may perform operation switching and continue processing.

The storage unit 211 stores programs and data needed for operation of the power management apparatus 200. The storage unit 211 may include a program area and a data area.

The program area may store a program to control the overall operation of the power management apparatus 200, an operating system (OS) to boot the power management apparatus 200, application programs needed for multimedia content playback, and application programs needed for optional functions of the power management apparatus 200 such as sound reproduction and image or video playback. The data area stores data generated in the course of operating the power management apparatus 200, such as image, video, phonebook and audio data.

In one embodiment of the present invention, the storage unit 211 stores different operating systems, and software driving the virtualization system.

The display unit 220 may be realized using display technology based on Liquid Crystal Display (LCD), Organic Light Emitting Diodes (OLED), or Active Matrix Organic Light Emitting Diodes (AMOLED). The display unit 220 visually presents various information, such as menus of the power management apparatus 200, input data and function setting information, to the user.

In one embodiment of the present invention, the display unit 220 is used to monitor the virtualization system, and is a separate entity from a display (not shown) contained in the hardware equipment 210.

The control unit 230 controls overall operations of individual components of the power management apparatus 200. In particular, the control unit 230 may create a virtualization layer to compose and operate a virtualization system employing different operating systems, and may control a series of power management operations at the virtualization layer. To this end, the control unit 230 may include a power manager 231.

In one embodiment, the power manager 231 is placed at the virtualization layer (not shown) created by the control unit 230. The power manager 231 may monitor usage states of real and virtual processors and predict workload of the virtual processor. Later, the power manager 231 may compute the amount of usage of the real processor to support the predicted workload and reconfigure the mapping between real processors and virtual processors according to the computation result. The power manager 231 may save information on the usage amount of the virtual processor and on the usage amount of the overall system, which makes it possible to conduct individual control actions using the saved information. The power manager 231 may extract information regarding types of applications running on each operating system, and sequences and associations therebetween from the collected information.

For workload prediction, the power manager 231 may compute prediction errors of a weighting algorithm and a simple PID (Proportional Integral Differential) algorithm, check whether a preselected algorithm is present, and select, if a preselected algorithm is absent, an algorithm exhibiting a smaller prediction error to predict workload.

To predict workload, the weighting algorithm may analyze the amount of work done in the past and assign weightings to the amount of work done at a specific point in time. Information on the amount of work done in the past may be obtained through monitoring of the virtualization system. In particular, weightings may be assigned to the amount of work done recently.

The workload may be predicted using the weighted amount of work done during N time intervals in the past as shown in Equation 1.

$$y[n+1] = \sum_{i=0}^{N-1} a_i \times x[n-1] \qquad \text{[Equation 1]}$$

Here, $a_i$ is a weighting assigned to the i-th time interval, x[i] and y[i] are the amount of work predicted at the i-th time interval, and N is the window size.

The weightings can be computed using Equation 2 below.

$$\Sigma a_i = 1, a_i = a_{i+1}, a_i = 1/N \qquad \text{[Equation 2]}$$

The simple PID algorithm is a simplified version of a PID algorithm used for feedback control. The simple PID algorithm uses a proportional weighting $K_p$, an integral weighting $K_i$ and a differential weighting $K_d$ to predict the amount of work at the next time interval. The simple PID algorithm may be represented by Equation 3 and Equation 4.

$$y[n+1] = K_p \cdot x[n] + K_i \left( \sum_{i=0}^{N-1} a_i \cdot x[n-1] \right) + K_d \cdot \max[x[n] - x[n-1], 0] \qquad \text{[Equation 3]}$$

$$K_p + K_i = 1, \sum a_i = 1, a_i = a_{i+1}, a_i = 1/N \qquad \text{[Equation 4]}$$

Here, $a_i$ is a weighting assigned to the i-th time interval, x[i] and y[i] are the amount of work predicted at the i-th time interval, and N is the window size.

When a preselected algorithm is present, the power manager 231 repeatedly checks a given number of times whether the prediction error of the selected algorithm is larger than that of the non-selected algorithm. If it has been repeatedly found in a row that the prediction error of the selected algorithm is larger than that of the non-selected algorithm, the power manager 231 may replace the selected algorithm. Selection between the two algorithms is depicted in FIG. 6.

Figure 6:
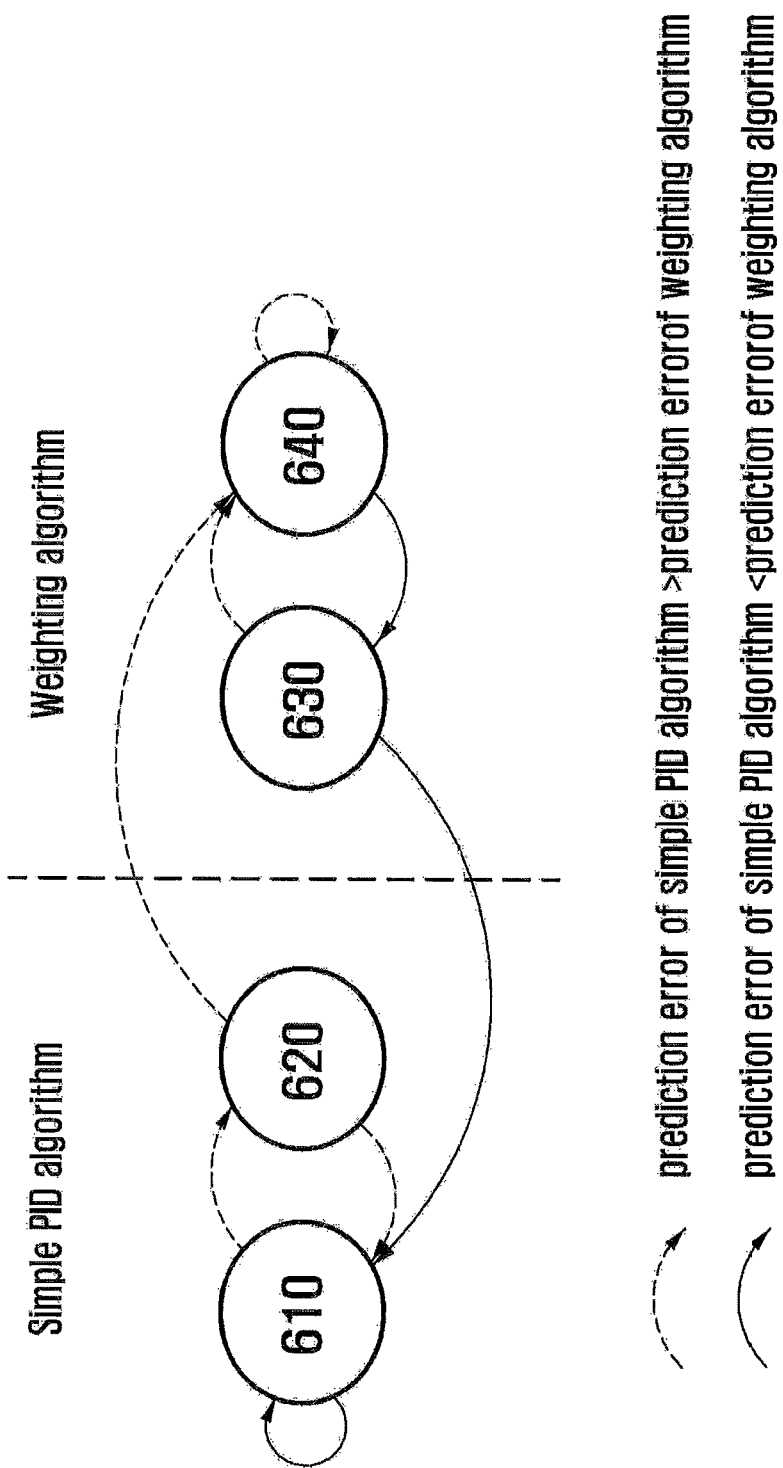
FIG. 6 is a diagram depicting replacement of prediction algorithms according to an embodiment of the present invention.

FIG. 6 is a diagram depicting replacement of prediction algorithms according to an embodiment of the present invention.

FIG. 6 depicts a situation where if it has been found two or more times in a row that the prediction error of the selected algorithm is larger than that of the non-selected algorithm, the selected algorithm is replaced. Initially, the simple PID algorithm is pre-selected in State 610. In State 610, if the prediction error of the simple PID algorithm is smaller than that of the weighting algorithm, the simple PID algorithm is used in succession without a transition from State 610. In State 610, if it has been found one more time that the prediction error of the simple PID algorithm is larger than that of the weighting algorithm, the simple PID algorithm is used in succession with a transition from State 610 to State 620.

In State 620, if the prediction error of the simple PID algorithm is smaller than that of the weighting algorithm at the next time interval, the simple PID algorithm is used in succession with a transition from State 620 back to State 610. In State 620, if the prediction error of the simple PID algorithm is larger than that of the weighting algorithm, the weighting algorithm is selected with a transition from State 620 to State 640.

In State 640, if the prediction error of the simple PID algorithm is larger than that of the weighting algorithm, the weighting algorithm is used in succession without a transition from State 640. In State 640, if it has been found one more time that the prediction error of the simple PID algorithm is smaller than that of the weighting algorithm, the weighting algorithm is used in succession with a transition from State 640 to State 630.

In State 630, if the prediction error of the simple PID algorithm is larger than that of the weighting algorithm at the next time interval, the weighting algorithm is used in succession with a transition from State 630 back to State 640. In State 630, if the prediction error of the simple PID algorithm is smaller than that of the weighting algorithm, the simple PID algorithm is selected with a transition from State 630 to State 610.

The power manager 231 selects a workload prediction algorithm through the process described above.

For reconfiguration of the mapping between real processors and virtual processors, the power manager 231 checks possibility of handling the predicted workload with the current mapping configuration, and may reconfigure the mapping by allocating an additional real processor if it is determined that such possibility is low.

Upon determining that such possibility is high, the power manager 231 checks necessity of raising the utilization level of the real processor with respect to the current utilization level, and may lower the utilization level of the real processor according to the predicted workload if it is not necessary to raise the utilization level. The power manager 231 may also raise the utilization level of the real processor according to the predicted workload if necessary.

The power manager 231 may adjust the operating frequency of the real processor to raise or lower the utilization level of the real processor. That is, to raise the utilization level of the real processor, the power manager 231 may increase the operating frequency of the real processor; and to lower the utilization level of the real processor, the power manager 231 may decrease the operating frequency of the real processor. Here, the operating frequency may be adjusted through Dynamic Voltage and Frequency Scaling (DVFS).

Although the power manager 231 predicts the workload, the possibility of an abrupt change in the workload always exists. Abrupt changes in the workload may affect system performance. Hence, in one embodiment, the mapping between real processors and virtual processors may be reconfigured by applying additional margins to the predicted workload.

Figure 9:
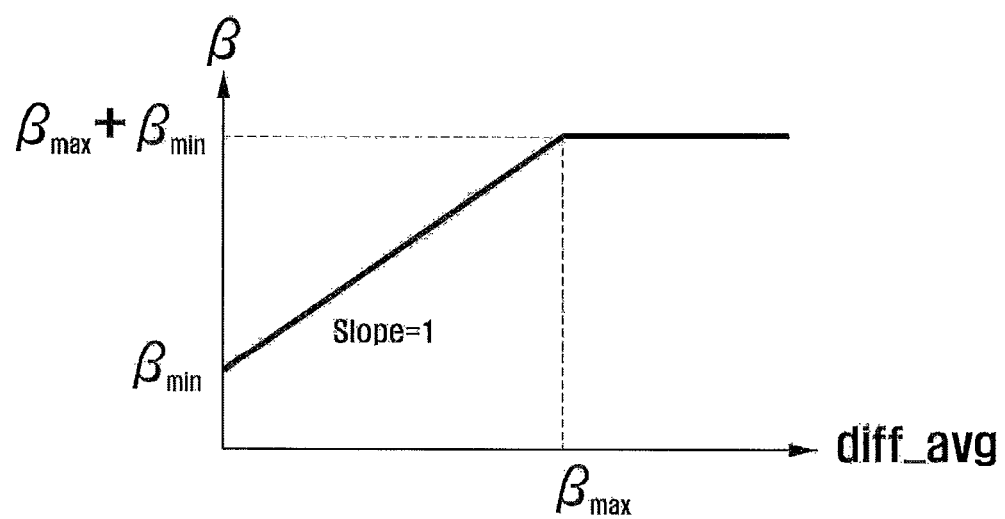
FIG. 9 is a graph depicting a margin algorithm according to an embodiment of the present invention.

FIG. 9 is a graph depicting a margin algorithm according to an embodiment of the present invention. Additional margins may be computed using Equations below.

$$\text{diff}_{abs}[n] = |x[n] - x[n-1]| \qquad \text{[Equation 5]}$$

$$\text{diff}_{avg} = avg(\text{diff}_{abs}[n] + \text{diff}_{abs}[n-1] + \ldots + \text{diff}_{abs}[n-(N-1)]) \qquad \text{[Equation 6]}$$

$$\text{Adaptivemargin}(\beta) = \text{diff}_{avg}, \text{ if } \text{diff}_{avg} < \beta_{max} \qquad \text{[Equation 7]}$$

$$\text{Adaptivemargin}(\beta) = \beta_{max}, \text{ if } \text{diff}_{avg} \geq \beta_{max} \qquad \text{[Equation 8]}$$

Here, x[i] is the amount of work predicted at the i-th time interval, and N is the window size.

As described above, it is possible to reduce overall system-wide power consumption by predicting resource utilization in multiple operating systems or applications.

In another embodiment, the power manager 231 monitors usage state of the virtual processor, and examines operation state of the hardware equipment when an operation state change command is received from the virtual processor. If the hardware equipment is concurrently used by multiple virtual processors, the power manager 231 may change the operation state of the hardware equipment in consideration of usage state of the hardware equipment.

If the hardware equipment is not concurrently used by multiple virtual processors, the power manager 231 may change the operation state of the hardware equipment according to the received operation state change command.

In the above embodiment, different power management schemes of multiple operating systems or applications are managed in an integrated manner at the virtualization layer, preventing a conflict that may be caused by application of different power management schemes.

In the above description, the control unit 230 and the power manager 231 are depicted as different blocks having different functions. However, this is for ease of description only, and the division of functions may vary. For example, a portion of the function of the power manager 231 may be performed directly by the control unit 230.

Figure 1:
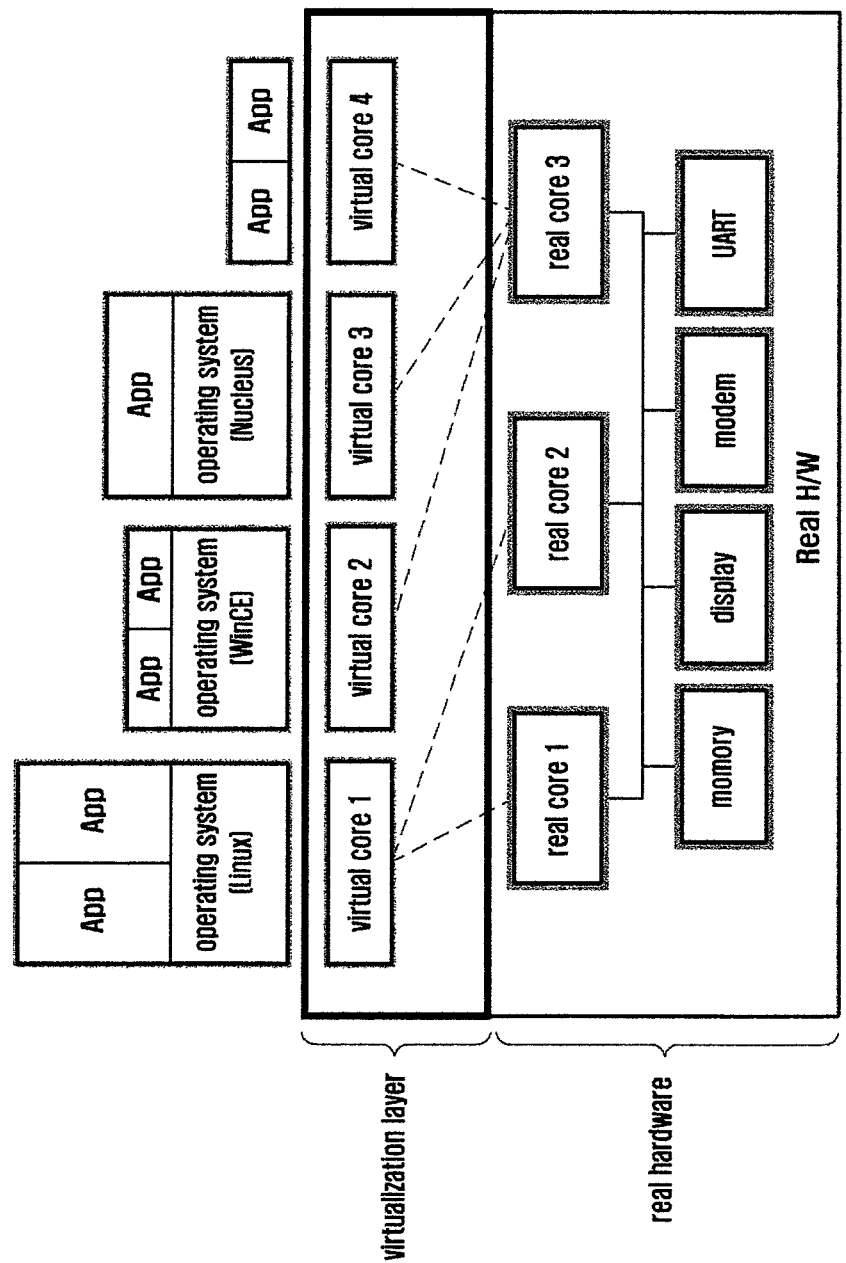
FIG. 1 illustrates a virtualization system according to the related art.
Figure 3:
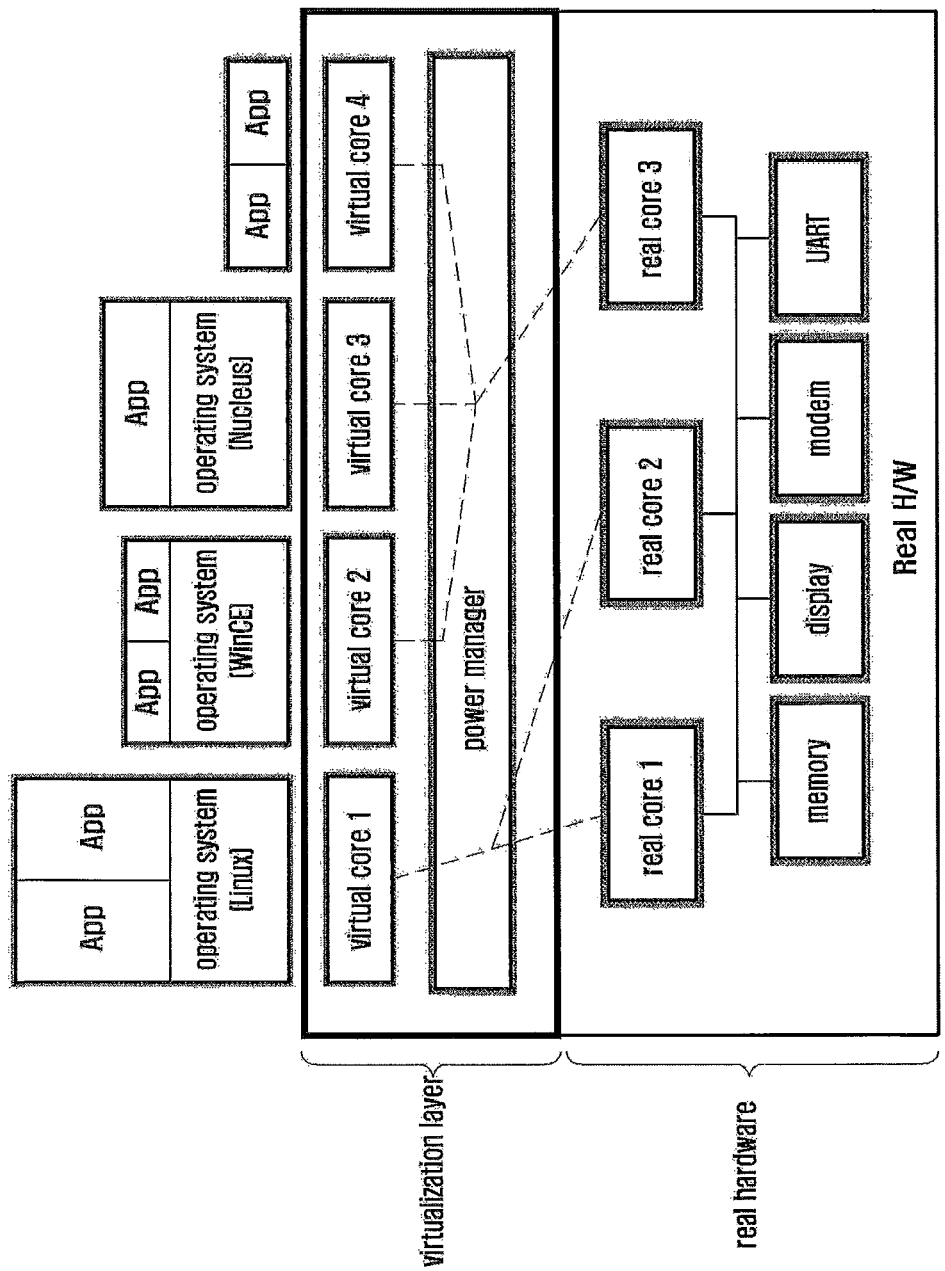
FIG. 3 illustrates a virtualization system according to an embodiment of the present invention.

FIG. 3 illustrates a virtualization system according to an embodiment of the present invention. In FIG. 3, unlike the related art virtualization system shown in FIG. 1, it can be seen that virtual cores are associated with real cores through the power manager.

Figure 4:
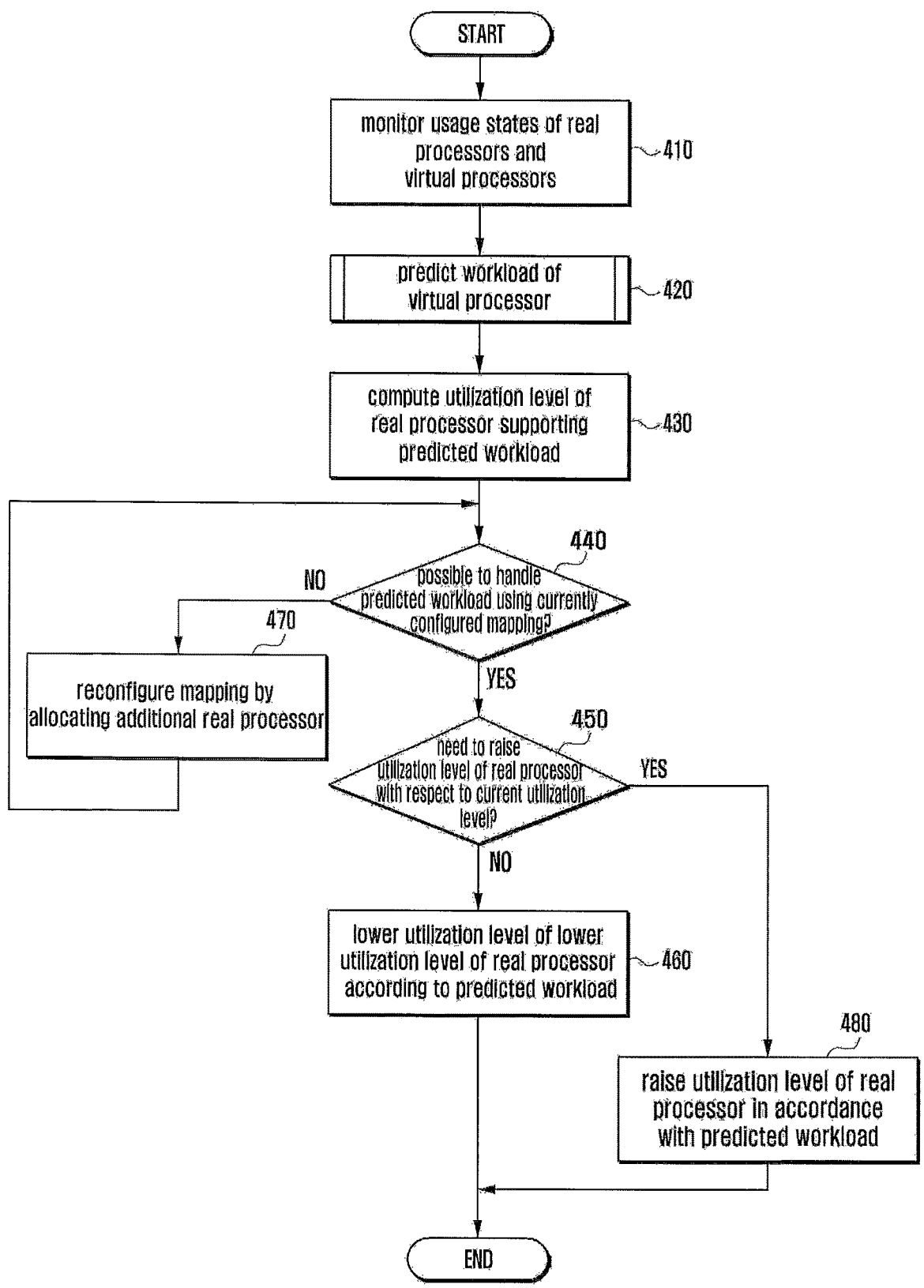
FIG. 4 is a flowchart of a method for power management according to an embodiment of the present invention.

FIG. 4 is a flowchart of a method for power management according to an embodiment of the present invention. In the following description, the control unit 230 directly performs the function of the power manager 231.

Referring to FIG. 4, at step 410, the control unit 230 monitors usage states of real processors actually performing tasks and usage states of virtual processors mapped with the real processors and executing operating systems and applications. At step 420, the control unit 230 predicts workload of the virtual processor. Here, the weighting algorithm and the simple PID algorithm may be used for workload prediction.

To predict workload, the weighting algorithm may analyze the amount of work done in the past and assign weightings to the amount of work done at a specific point in time. Information on the amount of work done in the past may be obtained through monitoring of the virtualization system. In particular, weightings may be assigned to the amount of work done recently.

The workload may be predicted using the weighted amount of work done during N time intervals in the past as shown in Equation 1.

$$y[n+1] = \sum_{i=0}^{N-1} a_i \times x[n-1] \quad \text{[Equation 1]}$$

Here, $a_i$ is a weighting assigned to the i-th time interval, x[i] and y[i] are the amount of work predicted at the i-th time interval, and N is the window size.

The weightings can be computed using Equation 2 below.

$$\Sigma a_i = 1, a_i = a_{i+1}, a_i = 1/N \quad \text{[Equation 2]}$$

The simple PID algorithm is a simplified version of a PID algorithm used for feedback control. The simple PID algorithm uses a proportional weighting $K_p$, an integral weighting $K_i$ and a differential weighting $K_d$ to predict the amount of work at the next time interval. The simple PID algorithm may be represented by Equation 3 and Equation 4.

$$y[n+1] = K_p \cdot x[n] + \quad \text{[Equation 3]}$$
$$K_i \left( \sum_{i=0}^{N-1} a_i \cdot x[n-1] \right) + K_d \cdot \max[x[n] - x[n-1], 0]$$

$$K_p + K_i = 1, \sum a_i = 1, a_i = a_{i+1}, a_i = 1/N \quad \text{[Equation 4]}$$

Here, $a_i$ is a weighting assigned to the i-th time interval, x[i] and y[i] are the amount of work predicted at the i-th time interval, and N is the window size.

Figure 5:
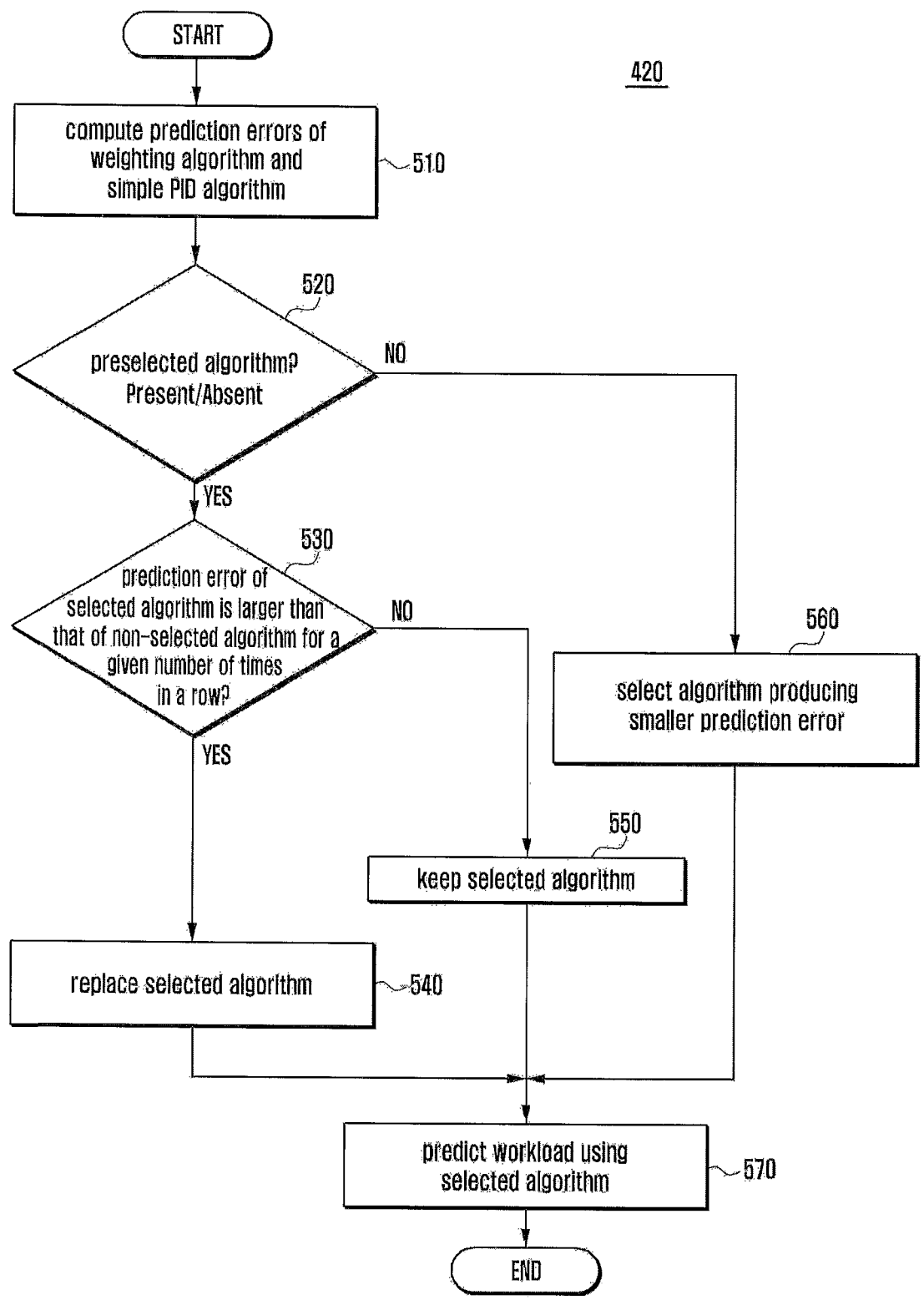
FIG. 5 is a flowchart of a procedure for workload prediction according to an embodiment of the present invention.

Step 420 is described in more detail in FIG. 5.

FIG. 5 is a flowchart of a procedure for workload prediction according to an embodiment of the present invention. At step 510, the control unit 230 computes prediction errors of the weighting algorithm and the simple PID algorithm.

At step 520, the control unit 230 checks whether a preselected algorithm is present. If a preselected algorithm is not present, the procedure proceeds to step 560 at which the control unit 230 selects one of the algorithms producing a smaller prediction error. At step 570, the control unit 230 predicts the workload using the selected algorithm.

If a preselected algorithm is present at step 520, the procedure proceeds to step 530 at which the control unit 230 repeatedly checks a given number of times whether the prediction error of the selected algorithm is larger than that of the non-selected algorithm. If it has been repeatedly found in a row that the prediction error of the selected algorithm is larger than that of the non-selected algorithm, the procedure proceeds to step 540 at which the control unit 230 replaces the selected algorithm. At step 570, the control unit 230 predicts the workload using the replacement algorithm. Selection between the two algorithms is depicted in more detail in FIG. 6.

FIG. 6 is a diagram depicting replacement of prediction algorithms according to an embodiment of the present invention.

FIG. 6 depicts a situation where if it has been found two or more times in a row that the prediction error of the selected algorithm is larger than that of the non-selected algorithm, the selected algorithm is replaced. Initially, the simple PID algorithm is pre-selected in State 610. In State 610, if the prediction error of the simple PID algorithm is smaller than that of the weighting algorithm, the simple PID algorithm is used in succession without a transition from State 610. In State 610, if it has been found one more time that the prediction error of the simple PID algorithm is larger than that of the weighting algorithm, the simple PID algorithm is used in succession with a transition from State 610 to State 620.

In State 620, if the prediction error of the simple PID algorithm is smaller than that of the weighting algorithm at the next time interval, the simple PID algorithm is used in succession with a transition from State 620 back to State 610. In State 620, if the prediction error of the simple PID algorithm is larger than that of the weighting algorithm, the weighting algorithm is selected with a transition from State 620 to State 640.

In State 640, if the prediction error of the simple PID algorithm is larger than that of the weighting algorithm, the weighting algorithm is used in succession without a transition from State 640. In State 640, if it has been found one more time that the prediction error of the simple PID algorithm is smaller than that of the weighting algorithm, the weighting algorithm is used in succession with a transition from State 640 to State 630.

In State 630, if the prediction error of the simple PID algorithm is larger than that of the weighting algorithm at the next time interval, the weighting algorithm is used in succession with a transition from State 630 back to State 640. In State 630, if the prediction error of the simple PID algorithm is smaller than that of the weighting algorithm, the simple PID algorithm is selected with a transition from State 630 to State 610.

The control unit 230 selects a workload prediction algorithm through the process described above.

If it has not been repeatedly found in a row that the prediction error of the selected algorithm is larger than that of the non-selected algorithm, the procedure proceeds to step 550 at which the control unit 230 keeps the selected algorithm. At step 570, the control unit 230 predicts the workload using the selected algorithm.

Referring back to FIG. 4, at step 430, the control unit 230 computes the utilization level of the real processor enough for supporting the predicted workload. At step 440, the control unit 230 checks possibility of handling the predicted workload by use of the currently configured mapping between real processors and virtual processors. If it is determined that such possibility is low, the procedure proceeds to step 470 at which the control unit 230 reconfigures the mapping by allocating an additional real processor. Thereafter, the procedure returns to step 440.

If it is determined that such possibility is high at step 440, the procedure proceeds to step 450 at which the control unit 230 checks necessity of raising the utilization level of the real processor with respect to the current utilization level. If it is not necessary to raise the utilization level, the procedure proceeds to step 460 at which the control unit 230 lowers the utilization level of the real processor according to the predicted workload. If it is necessary to raise the utilization level at step 450, the procedure proceeds to step 480 at which the control unit 230 raises the utilization level of the real processor in accordance with the predicted workload.

To raise or lower the utilization level of the real processor, the control unit 230 may adjust the operating frequency of the real processor. That is, to raise the utilization level of the real processor, the control unit 230 may increase the operating frequency of the real processor; and to lower the utilization level of the real processor, the control unit 230 may decrease the operating frequency of the real processor. Here, the operating frequency may be adjusted through Dynamic Voltage and Frequency Scaling (DVFS).

Although the control unit 230 predicts the workload, the possibility of an abrupt change in the workload always exists. Abrupt changes in the workload may affect system performance. Hence, in one embodiment, the mapping between real processors and virtual processors may be reconfigured by applying additional margins to the predicted workload.

FIG. 9 is a graph depicting a margin algorithm according to an embodiment of the present invention. Additional margins may be computed using Equations below.

$$\text{diff}_{abs}[n] = |x[n] - x[n-1]| \quad \text{[Equation 5]}$$

$$\text{diff}_{avg} = avg(\text{diff}_{abs}[n] + \text{diff}_{abs}[n-1] + \ldots + \text{diff}_{abs}[n-(N-1)]) \quad \text{[Equation 6]}$$

$$\text{Adaptivemargin}(\beta) = \text{diff}_{avg}, \text{ if } \text{diff}_{avg} < \beta_{max} \quad \text{[Equation 7]}$$

$$\text{Adaptivemargin}(\beta) = \beta_{max}, \text{ if } \text{diff}_{avg} \geq \beta_{max} \quad \text{[Equation 8]}$$

Here, x[i] is the amount of work predicted at the i-th time interval, and N is the window size.

As described above, it is possible to reduce overall system-wide power consumption by predicting resource utilization in multiple operating systems or applications.

Figure 7:
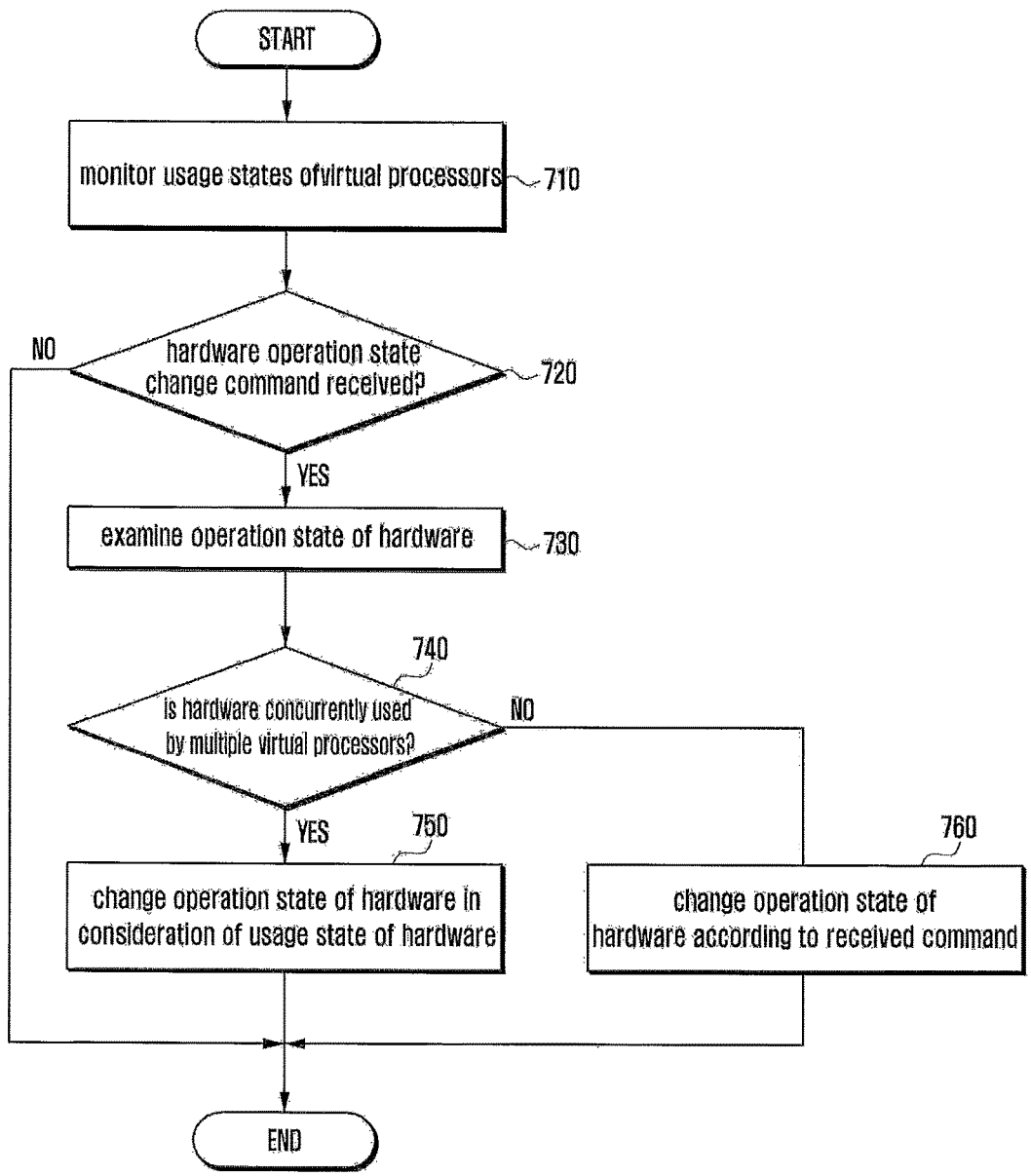
FIG. 7 is a flowchart of a method for power management according to another embodiment of the present invention.

FIG. 7 is a flowchart of a method for power management according to another embodiment of the present invention. In the following description, the function of the power manager 231 is performed directly by the control unit 230.

At step 710, the control unit 230 monitors usage states of real processors actually performing tasks and usage states of one or more virtual processors mapped with the real processors and executing operating systems and applications. At step 720, the control unit 230 checks whether an operation state change command for the hardware equipment is received from the virtual processor. If an operation state change command is not received, the procedure is immediately ended.

If an operation state change command is received, the procedure proceeds to step 730 at which the control unit 230 examines operation state of the hardware equipment. At step 740, the control unit 230 checks whether the hardware equipment is concurrently used by multiple virtual processors. If the hardware equipment is concurrently used by multiple virtual processors, the procedure proceeds to step 750 at which the control unit 230 changes the operation state of the hardware equipment in consideration of usage state of the hardware equipment. For example, when a virtual processor issues a power-save command to a piece of hardware while the piece of hardware is being used by another virtual processor, the control unit 230 may maintain the operation state of the hardware equipment so that a conflict does not occur.

If the hardware equipment is not concurrently used by multiple virtual processors, the procedure proceeds to step 760 at which the control unit 230 changes the operation state of the hardware equipment according to the received operation state change command.

In the above embodiment, different power management schemes of multiple operating systems or applications are managed in an integrated manner at the virtualization layer, preventing a conflict that may be caused by application of different power management schemes.

Figure 8:
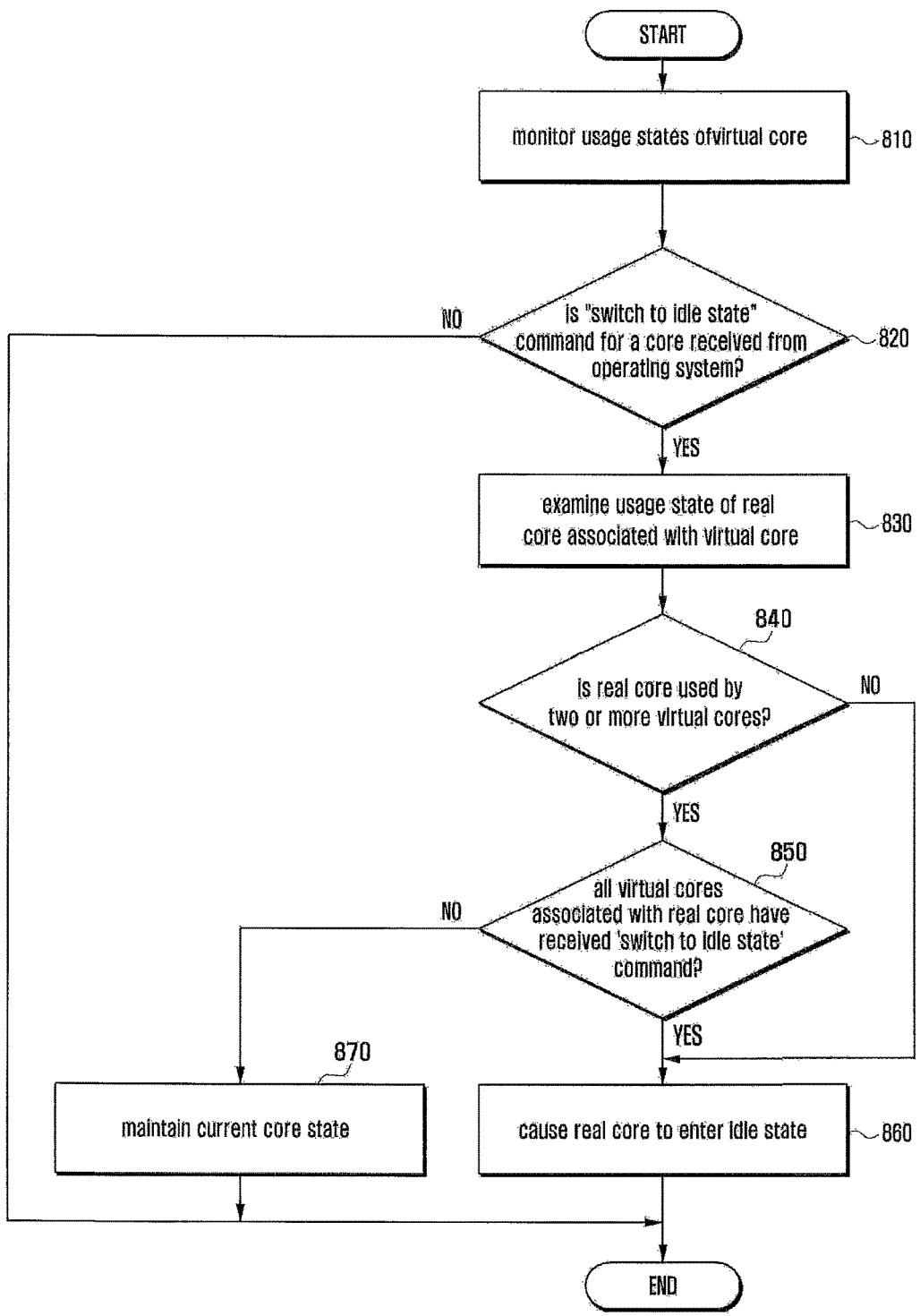
FIG. 8 is a flowchart of a method for power management according to another embodiment of the present invention.

A more detailed embodiment is described in FIG. 8. FIG. 8 is a flowchart of a method for power management according to another embodiment of the present invention.

At step 810, the control unit 230 monitors usage state of a virtual core. At step 820, the control unit 230 checks whether a "switch to idle state" command for a core is received from an operating system running on the virtual core. As an operating system cannot distinguish a virtual core from a real core, the virtual core and real core appear the same as a core to the operating system. In reality, the virtual core receives a command, which is then forwarded to the real core.

If such a command is not received, the procedure is immediately ended. If a "switch to idle state" command is received, the procedure proceeds to step 830 at which the control unit 230 examines usage state of a real core associated with the virtual core. At step 840, the control unit 230 checks whether the real core is used by two or more virtual cores. If the real core is not used by two or more virtual cores, the procedure proceeds to step 860 at which the control unit 230 causes the real core to enter idle state.

If the real core is used by two or more virtual cores at step 840, the procedure proceeds to step 850 at which the control unit 230 checks whether all virtual cores associated with the real core have received a "switch to idle state" command.

If all the virtual cores associated with the real core have received a "switch to idle state" command, the procedure proceeds to step 860 at which the control unit 230 causes the real core to enter idle state. If not all virtual cores associated with the real core have received a "switch to idle state" command, the procedure proceeds to step 870 at which the control unit 230 maintains the current state of the real core. This is an example for changing operation state of a real core (a piece of hardware) in consideration of usage state thereof.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims.

The invention claimed is:

1. A method for power management on a virtualization layer in a virtualization system using different operating systems, the method comprising:
monitoring usage states of real processors performing tasks and usage states of virtual processors mapped with the real processors, the virtual processors executing operating systems or applications;
determining workload of a virtual processor,
determining a utilization level of a real processor for supporting the determined workload; and
reconfiguring the mapping between real processors and virtual processors according to the utilization level of the real processors; wherein determining the workload of the virtual processor comprises:
determining errors of a weighting algorithm and a simple proportional integral differential (PID) algorithm;
identifying whether a selected algorithm is present; and
selecting, when the selected algorithm is not present, another algorithm producing a smaller error.

2. The method of claim 1, wherein determining the workload of the virtual processor further comprises:
repeatedly identifying, when the selected algorithm is present, a given number of times whether an error of the selected algorithm is larger than that of a non-selected algorithm; and
replacing, when for the given number of times in a row the error of the selected algorithm is larger than that of the non-selected algorithm, the selected algorithm.

3. The method of claim 2, wherein determining the workload of the virtual processor further comprises maintaining, when for the given number of times in a row the prediction error of the selected algorithm is smaller than or equal to that of the non-selected algorithm, the selected algorithm.

4. The method of claim 1, wherein reconfiguring the mapping between real processors and virtual processors comprises:
determining a possibility of handling the determined workload by use of a currently configured mapping; and
reconfiguring, upon determining that the handling possibility is low, the mapping by allocating an additional real processor.

5. The method of claim 4, wherein reconfiguring the mapping between real processors and virtual processors further comprises:
determining, upon determining that the handling possibility is high, necessity of increasing the utilization level of the real processor with respect to a current utilization level; and
decreasing, when not necessary to raise the utilization level, the utilization level of the real processor according to the determined workload.

6. The method of claim 5, wherein reconfiguring the mapping between real processors and virtual processors further comprises increasing, when necessary to increase the utilization level, the utilization level of the real processor in accordance with the determined workload.

7. The method of claim 1, wherein reconfiguring the mapping between real processors and virtual processors comprises adding margins to the determined workload so as to prevent an abrupt change in the workload.

8. An apparatus for power management in a virtualization system using different operating systems, the apparatus comprising:
real processors configured to perform tasks;
virtual processors mapped with the real processors and configured to execute operating systems or applications; and
a controller configured to monitor usage states of the real processors and the virtual processors, on a virtualization layer, determine workload of a virtual processor, determine a utilization level of a real processor for supporting the determined workload, reconfigure the mapping between the real processors and virtual processors according to the utilization level of the real processors, determine errors of a weighting algorithm and a simple proportional integral differential (PID) algorithm, identify whether a selected algorithm is present, and select, when a selected algorithm is not present, another algorithm producing a smaller error.

9. The apparatus of claim 8, wherein, when a selected algorithm is present, the controller is configured to repeatedly identify a given number of times whether an error of the selected algorithm is larger than that of a non-selected algorithm, and replace, when for the given number of times in a row the error of the selected algorithm is larger than that of the non-selected algorithm, the selected algorithm.

10. The apparatus of claim 9, wherein, when for the given number of times in a row the error of the selected algorithm is smaller than or equal to that of the non-selected algorithm, the controller is configured to maintain the selected algorithm.

11. The apparatus of claim 8, wherein, for mapping reconfiguration, the controller is configured to check a possibility of handling the determined workload by use of a currently configured mapping, and reconfigure, upon determining that the handling possibility is low, the mapping by allocating an additional real processor.

12. The apparatus of claim 11, wherein, upon determining that the handling possibility is high, the controller is configured to determine necessity of increasing the utilization level of the real processor with respect to a current utilization level, and decrease, when not necessary to increase the utilization level, the utilization level of the real processor according to the determined workload.

13. The apparatus of claim 12, wherein, when necessary to increase the utilization level, the controller is configured to increase the utilization level of the real processor in accordance with the determined workload.

14. The apparatus of claim 8, wherein the controller is configured to reconfigure the mapping by adding margins to the determined workload so as to prevent an abrupt change in the workload.

15. A method for power management on a virtualization layer in a virtualization system using different operating systems, the method comprising:

monitoring usage states of one or more virtual processors mapped with real processors, the virtual processors executing operating systems or applications;
determining errors of a weighting algorithm and a simple proportional integral differential (PID) algorithm;
identifying whether a selected algorithm is present;
selecting, when the selected algorithm is not present, another algorithm producing a smaller error;
determining workload of the one or more virtual processors based on the selected algorithm;
identifying an operation state of hardware equipment based on the workload of the one or more virtual processors; and
changing, when the hardware equipment is concurrently used by multiple virtual processors, the operation state of the hardware equipment based on usage state of the hardware equipment.

16. The method of claim 15, further comprising changing, when the hardware equipment is not concurrently used by multiple virtual processors, the operation state of the hardware equipment according to a received operation state change command.

17. An apparatus for power management in a virtualization system using different operating systems, the apparatus comprising:
one or more virtual processors mapped with real processor configured to perform tasks, the virtual processors configured to execute operating systems or applications;
a hardware equipment configured to perform an operation indicated by a command from a virtual processor; and
a controller configured to:
monitor usage states of the virtual processors, on a virtualization layer;
determine errors of a weighting algorithm and a simple proportional integral differential (PID) algorithm;
identify whether a selected algorithm is present;
select, when the selected algorithm is not present, another algorithm producing a smaller error;
determine workload of the one or more virtual processors based on the selected algorithm;
Identify an operation state of the hardware equipment based on the workload of the one or more virtual processors; and
change, when the hardware equipment is concurrently used by multiple virtual processors, the operation state of the hardware equipment based on usage state of the hardware equipment.

18. The apparatus of claim 17, wherein, when the hardware equipment is not concurrently used by multiple virtual processors, the controller is configured to change the operation state of the hardware equipment according to a received operation state change command.

* * * * *